United States Patent Office 3,102,900
Patented Sept. 3, 1963

3,102,900
ALKYL PHOSPHONATE ESTERS AND PROCESS FOR PREPARING SAME
Ellis K. Fields, Chicago, Ill., assignor to Standard Oil Company, Chicago, Ill., a corporation of Indiana
No Drawing. Filed July 11, 1962, Ser. No. 209,223
16 Claims. (Cl. 260—461)

This invention relates to organo-phosphorus compositions and to their preparation. It particularly relates to the preparation of omega-phosphonyl-substituted aliphatic acids or ketones and new compounds obtained thereby.

It has been discovered that organic compounds free of olefinic unsaturation of a cyclic structure having a peroxide grouping attached directly to one of the carbon atoms in said cyclic structure, when reacted with organic phosphites under reduction-oxidation conditions, yield an omega-phosphonyl-substituted aliphatic acid or ketone as well as the corresponding aliphatic acid or ketone derived from one cyclic peroxide molecule. The reactions involved in the method of this invention are represented broadly as follows:

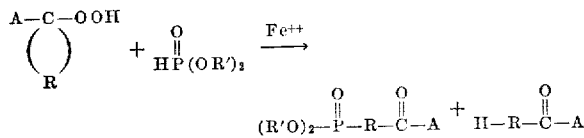

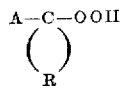

The term "cyclic peroxide" as used herein is broadly intended to cover compounds of the formula

wherein R is a divalent organo radical having a carbon chain of from 3 to about 40 carbon atoms in its structure. A represents a hydroxyl group or an organic radical free of olefinic unsaturation, preferably phenyl or alkyl groups of 1 to 6 carbon atoms. The cyclic peroxides suitable for use in this invention are those compounds free of olefinic unsaturation. The term "olefinic unsaturation" refers to non-aromatic double or triple bonds. Such cyclic peroxides are those containing from 4 to about 40 carbon atoms in the primary ring structure. The primary ring structure represented by

R R can be an unsubstituted methylene chain or can contain one or more hydrocarbyl or other unreactive substituents of the group consisting of alkyl, aryl, alkoxy, aryloxy, halogen or nitro. Any cyclic peroxide free of olefinic unsaturation obtainable by the reaction of oxygen with $C_{4-40}$ cycloalkanols and corresponding substituted cycloalkanols or hydrogen peroxide with $C_{4-40}$ cycloalkanones or corresponding substituted cycloalkanones are suitable for use in this invention. Preferred cyclic peroxides are those obtained from the reaction of hydrogen peroxide with cyclopentanone, cyclohexanone, and cycloheptanone (where R equals $—(CH_2)_4—$, $—(CH_2)_5—$, and $—(CH_2)_6—$ respectively), and the oxidation products of cyclic alcohols and hydrocarbons. These include cyclopentanone peroxide, cyclohexanone peroxide, cycloheptanone peroxide, methylcyclohexyl hydroperoxide, ethylcyclopentyl hydroperoxide, phenylcyclohexyl hydroperoxide, etc. following the above definitions for A and R.

The term "phosphite" refers to organic diesters of phosphorus acid having the formula

wherein R' is an organic radical free of olefinic unsaturation. Any organic radical unreactive under the conditions of the method of this invention can be used. Preferably such radicals are selected from the group consisting of alkyl, aryl, alkaryl, aralkyl, alkoxy, aryloxy, amido, and such radicals substituted with halogen or nitro groups. The preferred phosphites are the di-($C_{1-22}$) alkyl phosphites. Exemplary phosphites are dimethylphosphite, dibutyl phosphite, dioctyl phosphite, didecyl phosphite, dioctadecyl phosphite, diphenyl phosphite, phenylmethyl phosphite, dinaphthyl phosphite, etc. Correspondingly, the thio analogs, such as dibutylthiophosphite, can be used in preparing omega-thiophosphonyl-substituted aliphatic acids or ketones in accordance with this invention. Such thiophosphites are represented by the following formulas

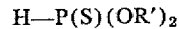

and

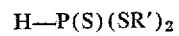

The use of reduction-oxidation conditions is essential for the conversion of the cyclic peroxides to the corresponding omega-phosphonyl-substituted aliphatic acids or ketones and corresponding aliphatic acids or ketones. The term "redox" is used herein in its widely accepted sense to designate a reduction-oxidation reaction wherein an electron transfer takes place with the simultaneous formation of a free radical. In order for this reaction to take place it is necessary that there be present a substance, or substances, which acts as a reducing agent for the peroxide compound. Those lower valence compounds of heavy metals which are capable of existing in several valence states, such as iron, chromium, manganese, cobalt, copper and molybdenum, are suitable reducing agents to be used. Certain organic and inorganic compounds may also be used, such as sodium bisulfite, reducing sugars, 1-ascorbic acid, sodium formaldehyde sulfoxylate, and other reducing agents known in the redox art.

The invention will be illustrated by the use of the ferrous ion but is not to be limited thereby. In general, when using a metal ion such as ferrous ion alone, the amount of ion used is equivalent to, or in excess of, the amount of peroxide to be reacted. Ions in higher valence states may be used in trace amounts as promoters with any of the aforementioned reducing agents which serve to convert, for example, the ferric ion to the ferrous ion. Because of low cost, availability and efficiency, the ferrous ion is preferred in the reaction.

The reaction of this invention for the conversion of cyclic peroxide compounds to long-chain ketones or carboxylic acids and corresponding omega-phosphonyl-substituted ketones or carboxylic acids can be carried out in various solvents, such as water, aqueous alcohols, aromatic hydrocarbons, ethers, esters, dioxane and other mixtures, or in the emulsion state. Pressures below or slightly above atmospheric may be used. In general, the reaction proceeds at atmospheric pressure and at temperatures in the range of −50° C. to 55° C. The reaction is best carried out at low temperatures in the order of 0° C. as illustrated in the examples. Since the peroxides are explosive, care should be taken in carrying out the reaction to avoid reaching temperatures and pressures of thermal decomposition of the peroxides. The reaction is best carried out in a solvent common for the peroxide compound, the phosphite and the reducing agent, since thereby rapid intermixture of reactants is possible and side-reactions are minimized. When inorganic ferrous salts are used as the reducing agent, an acidic aqueous medium is the preferred common solvent. The common mineral acids, nitric, hydrochloric, sulfuric, and phosphoric; preferably sulfuric and phosphoric, are used as the acidifying agents in amounts of from about 1 to 30% by weight for preparing the acidic aqueous medium. Non-aqueous media may be used with ferrous salts of fatty acids. In conducting the reaction in the emulsion state using immiscible but selective solvents for the peroxide and phosphite reactants, the use of a dispersion agent brings about proper intermixing.

The reaction can be carried out in a batch-wise or continuous manner. Some species of the cyclic peroxide reactants are highly explosive and quite sensitive to shock. Accordingly, precautions should be taken in handling these materials.

The omega-phosphonyl-substituted aliphatic acids or ketones of this invention can be separated from the reaction mixture by various means known in the art, such as withdrawal of the organic phase from the reaction mixture. The acids can be formed into esters or salts, and separated by distillation, extraction, ion-exchange techniques or selective adsorption. The ferric ion by-product of the reaction can be recovered as such by ion-exchange or by reduction or by recycling to the process.

The reaction is carried out merely by mixing the reactants in the presence of the redox reducing agent, which contacting is facilitated by the use of a solvent. The molar ratio of cyclic peroxide to redox reducing agent to phosphite may vary from 1:1:1 to 1:1.5:5.

In accordance with this invention, there is provided a new class of organo-phosphorus compounds having the general formula $$(RO)_2-P(O)-(CH_2)_5-COOR$$

wherein R is selected from a group consisting of hydrogen and a $C_{1-22}$ alkyl radical. These new compounds are useful as synthetic lubricants, hydraulic fluids, detergents, solvents and plasticizers.

The invention is illustrated in the following examples showing the preparation of omega-phosphonyl-substituted caproic acids from cyclohexanone peroxide ("cyclohexanol hydroperoxide").

*Example I*

To a stirred solution of 113.4 g. (0.41 mole) ferrous sulfate heptahydrate and 20 ml. concentrated sulfuric acid in 200 ml. water at 0 to 5° C. was added a solution of 52.8 g. (0.4 mole) cyclohexanone peroxide in 117 ml. (0.6 mole) dibutyl phosphite over 1.5 hours. The reaction mixture was stirred for an additional hour while maintaining the temperature at 5° C. The insoluble iron salt formed during the course of the reaction was removed from the reaction mixture by filtration. The filtrate was allowed to stand and separate into two phases. The upper organic phase after separation from the filtrate was refluxed for three hours with 100 ml. of n-butanol and 2 ml. concentrated sulfuric acid with continuous removal of water in a Stark and Dean trap. Thereafter the solution was cooled and washed with 5% aqueous sodium carbonate, dried over Drierite, filtered and fractionally distilled. There was obtained 15 g. (46 mole percent) of butyl caproate, B.P.$_{.5\ mm.}$ 72.4 to 73.3° C., $n_D^{20}$ 1.4168; 40 g. of dibutyl phosphate, B.P.$_{.5\ mm.}$ 103.3–103.9° C., $n_D^{20}$ 1.4239; and 15 g. (22 mole percent) of the tributyl ester of omega-phosphonyl caproic acid,

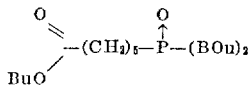

B.P.$_{.4.8-5.3\ mm.}$ 137.5–140° C., $n_D^{20}$ 1.4319.

*Analysis.*—Calculated for $C_{18}H_{37}O_5P$: C, 59.3; H, 10.2; P, 8.5; mol. wt., 364. Found: C, 59.0; H, 10.4; P, 8.1; mol. wt., 362.

The infrared spectrum of this tributyl ester showed the C—H band at 3.4 microns, the carbonyl band at 5.75 microns, and the phosphonyl band with 2 electronegative substituents (—OC$_4$H$_9$) at 7.93 microns.

The insoluble iron salt was suspended in 100 ml. water and stirred with 20 ml. concentrated ammonium hydroxide for 30 minutes. The mixture was filtered from Fe(OH)$_3$ and the filtrate acidified with excess hydrochloric acid. The heavy oil that precipitated was taken up in the ether, the ether solution washed with water, dried over Drierite, filtered and evaporated, finally at a pot temperature of 165° C. and a pressure of 0.4 mm., giving 18.5 (36 mole percent) viscous yellow oily acid, $n_D^{20}$ 1.4300.

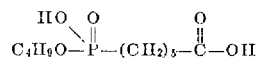

*Analysis.*—Calculated for $C_{10}H_{21}PO_5$: C, 47.6; H, 8.3; P, 12.3. Found: C, 43.8; H, 8.9; P, 15.0.

The tributyl ester of this example is an excellent solvent for polyvinyl chloride and polyvinyl acetate, and in plastics made therefrom functions as a plasticizer that does not support combustion.

*Example II*

This example illustrates the recovery of the omega-phosphonyl-substituted caproic acid from the reaction mixture through conversion to its potassium salt. To a stirred mixture of 113.4 g. (0.41 mole) ferrous sulfate heptahydrate, 200 ml. water, and 50 ml. concentrated sulfuric acid was added a solution of 52.8 g. (0.4 mole) cyclohexanone peroxide in 117 ml. (0.6 mole) dibutyl phosphite over 0.5 hour at 0 to 5° C. The mixture was stirred 1 hour at 5° C. and filtered from an insoluble iron salt. The upper layer of the filtrate was separated, diluted with 100 ml. ether, and extracted with a cold solution of 32 g. KOH in 150 ml. water, keeping the temperature at 10° C. by the addition of ice. The aqueous alkaline extract was acidified with excess cold dilute hydrochloric acid at 5 to 10° C. and extracted with ether. The ether solution was washed with water, dried over Drierite, filtered, and evaporated in vacuo at a pot temperature up to 160° C. at 0.4 mm. The yellow oily acid

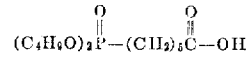

weighed 37 g. (60 mole percent).

*Analysis.*—Calculated for $C_{14}H_{29}PO_5$: C, 54.5; H, 9.4; P, 10.1. Found: C, 53.1; H, 9.9; P, 11.7.

The iron salt was decomposed with NH$_4$OH and worked up as in Example 1, giving 10 g. (20 mole percent) monobutyl ester,

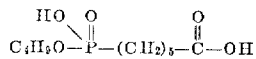

*Analysis.*—Calculated for $C_{10}H_{21}PO_5$: C, 47.6; H, 8.3; P, 12.3. Found: C, 47.6; H, 9.1; P, 13.5.

12.1 g. (52 mole percent) of caproic acid boiling at 200 to 205° C. was obtained by redistillation of the low-boiling material from the vacuum evaporations.

*Example III*

To a solution of 113.4 g. (0.41 mole) ferrous sulfate heptahydrate and 30 ml. concentrated sulfuric acid in 200 ml. water at 0 to 5° C. was added a solution of 52.8 g. (0.4 mole) cyclohexanone peroxide in 196.2 ml. (184 g., 0.6 mole) di-2-ethylhexyl phosphite with stirring over 1½ hours. The mixture was stirred for an additional 0.5 hour, diluted with 100 ml. ether and filtered. The upper layer of the filtrate was extracted with a solution of 28 g. KOH in 200 ml. water, the alkaline water solution acidified with excess hydrochloric acid, and extracted with ether. The ether solution was washed with water, dried over anhydrous sodium sulfate, filtered, and distilled in vacuo, giving 9.1 g. (39 mole percent) caproic acid B.P.$_{.5\text{ mm.}}$ 90 to 93° C., and $n_D{}^{20}$ 1.4153, and leaving a residue that did not distil up to a pot temperature of 160° C. and 0.2 mm. pressure. The residue weighed 48.4 g. and was shown to be

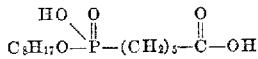

in 78 mole percent yield by its solubility in alkali and its elemental analysis.

*Analysis.*—Calculated for $C_{14}H_{29}PO_5$: C, 54.5; H, 9.4; P, 10.1. Found: C, 52.7; H, 7.9; P, 11.3.

The mono-2-ethylhexyl ester of this example is a low foaming surfactant in dilute aqueous alkali, which suspends charcoal and emulsifies mineral oils.

From the foregoing description, it is apparent that the present invention provides a simplified procedure for the preparation of omega-phosphonyl-substituted aliphatic acids or ketones from any substituted or unsubstituted cyclic peroxide free of olefinic unsaturation, containing from 4 to about 40 carbon atoms in its ring structure.

It will be apparent to one skilled in the art that even though the omega-phosphonyl compounds obtained by the reaction of a cyclic peroxide and a phosphite in the presence of a redox reducing agent have been referred to herein as omega-phosphonyl-substituted aliphatic acids or ketones, such compounds can be considered to be keto-substituted or terminal carboxy-substituted alkyl phosphonic acids or phosphonates, depending on the nature of A in the formula hereinbefore set forth for the cyclic peroxide.

Thus, having described the invention, what is claimed is:

1. The method which comprises reacting (A) a cyclic peroxide free of olefinic unsaturation of the formula

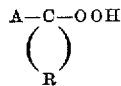

wherein A is a member of the group consisting of hydroxyl, alkyl and aryl radicals, and R is a divalent hydrocarbon radical having a carbon chain of from 3 to about 40 carbon atoms in its structure, and (B) a phosphite having the formula H—P(O)—(OR')$_2$ wherein R' is a raidcal of the group consisting of alkyl, aryl, alkaryl, aralkyl, alkoxy, aryloxy, amido and such radicals containing halogen and nitro substituents, in the presence of a redox reducing agent at a temperature sufficient to effect the reaction not greater than about 55° C., and separating from the reaction mixture compounds of the formula

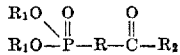

wherein R is as above described, R$_1$ is a member of the group consisting of hydrogen and R', and R$_2$ is a member of the group consisting of A and OR'.

2. The method of claim 1 wherein said redox reducing agent is the ferrous ion.

3. The method of claim 1 wherein A is hydroxyl.

4. The method of claim 1 wherein A is a $C_{1-6}$ alkyl radical.

5. The method of claim 1 wherein R is a $C_{3-40}$ alkylene radical.

6. The method of claim 1 wherein R' is a $C_{1-22}$ alkyl radical.

7. The method of claim 1 wherein said reaction is conducted in the presence of a redox reducing agent comprising a heavy metal ion capable of existing in several valence states, and by the use of temperatures ranging from about −50° C. to about 55° C. in the presence of a mutual solvent.

8. The method of claim 1 wherein said cyclic peroxide is a C4–40 cycloalkanone peroxide, said phosphite is a di($C_1$-$C_{22}$)alkyl phosphite, and said reaction is conducted in the presence of a ferrous ion at a temperature within the range of from about −50° C to about 55° C. in an acidic aqueous reaction medium.

9. The method which comprises reacting (A) cyclohexanone peroxide and (B) a di($C_1$-$C_{22}$)alkyl phosphite in the presence of ferrous sulfate in an aqueous reaction medium containing from about 1 to about 30 weight percent sulfuric acid at a temperature between about 0° and 5° C., and separating from the reaction medium compounds of the formula

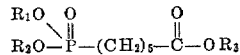

wherein R$_1$, R$_2$ and R$_3$ are each selected from the group consisting of hydrogen and $C_{1-22}$ alkyl radicals.

10. The method of claim 9 wherein said phosphite is dibutylphosphite.

11. The method of claim 9 wherein said phosphite is dioctyl phosphite.

12. The compound having the formula $(C_4H_9O)_2$—P(O)—$(CH_2)_5$—COOH

13. The compound having the formula

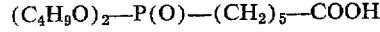

14. The compound having the formula $(C_8H_{15}O)_2$—P(O)—$(CH_2)_5$—COOH

15. The compound having the formula

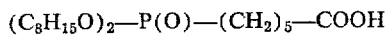

16. An organo-phosphorus compound having the formula:

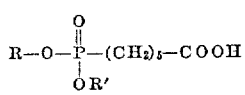

wherein R is a $C_{1-22}$ alkyl radical and R' is a member of the group consisting of hydrogen and a $C_{1-22}$ alkyl radical.

References Cited in the file of this patent

UNITED STATES PATENTS

| | | |
|---|---|---|
| 2,754,320 | Johnston | July 10, 1956 |
| 2,963,458 | Swern | Dec. 6, 1960 |
| 2,988,558 | Swern | June 13, 1961 |

OTHER REFERENCES

Chem. Ber., vol. 59, January–June 1926, pp. 119–1124.

UNITED STATES PATENT OFFICE
CERTIFICATE OF CORRECTION

Patent No. 3,102,900                               September 3, 1963

Ellis K. Fields

It is hereby certified that error appears in the above numbered patent requiring correction and that the said Letters Patent should read as corrected below.

Column 1, line 50, for

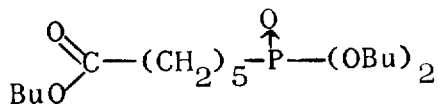

column 2, line 53, for "any of the aforementioned" read -- any one of the aforementioned --; column 3, lines 70 to 73, the formula should appear as shown below instead of as in the patent:

$$\underset{BuO}{\overset{O}{\nwarrow}}C-(CH_2)_5-\overset{O}{\underset{}{P}}-(OBu)_2$$

Signed and sealed this 3rd day of March 1964.

(SEAL)
Attest:
ERNEST W. SWIDER
Attesting Officer

EDWIN L. REYNOLDS
Acting Commissioner of Patents